(12) United States Patent
Sunkara et al.

(10) Patent No.: US 10,766,787 B1
(45) Date of Patent: Sep. 8, 2020

(54) PRODUCTION OF MIXED METAL OXIDE NANOSTRUCTURED COMPOUNDS

(71) Applicant: University of Louisville Research Foundation, Inc., Louisville, KY (US)

(72) Inventors: Mahendra Sunkara, Louisville, KY (US); Babajide Patrick Ajayi, Louisville, KY (US); Daniel F. Jaramillo-Cabanzo, Louisville, KY (US); Hugo Apolo Nambo Salgado, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 445 days.

(21) Appl. No.: 15/342,048

(22) Filed: Nov. 2, 2016

Related U.S. Application Data

(60) Provisional application No. 62/249,518, filed on Nov. 2, 2015.

(51) Int. Cl.
*B82Y 40/00* (2011.01)
*C01G 53/00* (2006.01)
(Continued)

(52) U.S. Cl.
CPC ............ *C01G 53/68* (2013.01); *B01J 19/081* (2013.01); *C01G 25/006* (2013.01);
(Continued)

(58) Field of Classification Search
CPC ........ B01J 19/126; B01J 19/129; B01J 19/00; B01J 19/081; B01J 2219/1206; B01J 2219/0881; B01J 2219/0898; B01J 2219/0877; B01J 2219/1245; B01J 2219/1248; B01J 2219/1251; B01J 2219/1266; B01J 2219/1269; B01J 2219/1275; B01J 2219/1287; B01J 2219/0862; C01G 45/00; C01G 59/00; C01G 53/00; C01G 51/00; C01G 51/52;
(Continued)

(56) References Cited

U.S. PATENT DOCUMENTS 6,099,164 A    8/2000   Rosen et al.
7,357,910 B2   4/2008   Phillips et al.
(Continued)

OTHER PUBLICATIONS

Kapoor, Bhagi, Mulukutla, Klabunde, "Mixed Metal Oxide Nanoparticles", Dekker Encyclopedia of Nanoscience and Nanotechnology, 2004, pp. 2007-2017, Marcel Dekker Inc., New York, NY 10016.
(Continued)

*Primary Examiner* — Smita S Patel
(74) *Attorney, Agent, or Firm* — Law Office of J. L. Simunic; Joan L. Simunic

(57) ABSTRACT

A method for the rapid and controlled synthesis of mixed metal oxide nanoparticles using relatively low temperature plasma oxidation of liquid droplets of predetermined mixed metal precursors is disclosed. The resulting nanoparticles reflect the metal precursor stoichiometries and the mixed metal oxide's metastable phase can be controlled. The synthesis of mixed transition metal oxide comprising binary metal oxides, ternary mixed metal oxides, quaternary mixed metal oxides and pentanary mixed metal oxides are demonstrated herein.

5 Claims, 2 Drawing Sheets

(51) Int. Cl.
    *C01G 25/00* (2006.01)
    *C01G 51/00* (2006.01)
    *C01G 45/12* (2006.01)
    *C01G 55/00* (2006.01)
    *B01J 19/08* (2006.01)

(52) U.S. Cl.
    CPC ......... *C01G 45/1264* (2013.01); *C01G 51/40* (2013.01); *C01G 53/40* (2013.01); *C01G 53/50* (2013.01); *C01G 55/002* (2013.01); *B01J 2219/0877* (2013.01); *B01J 2219/0898* (2013.01); *C01P 2004/64* (2013.01)

(58) Field of Classification Search
    CPC ........ C01G 51/54; C01G 51/56; C01G 51/58; B82Y 99/00; B82Y 40/00
    See application file for complete search history.

(56) References Cited

U.S. PATENT DOCUMENTS

| | | | |
|---|---|---|---|
| 7,591,897 | B2 | 9/2009 | Sunkara et al. |
| 7,771,689 | B2 | 8/2010 | Sunkara et al. |
| 7,819,974 | B2 | 10/2010 | Sunkara et al. |
| 8,007,758 | B2 | 8/2011 | Stark et al. |
| 8,211,388 | B2 * | 7/2012 | Woodfield ............ B22F 1/0018 423/1 |
| 8,679,246 | B2 | 3/2014 | Jordan et al. |
| 8,748,785 | B2 | 6/2014 | Jordan et al. |
| 9,216,406 | B2 | 12/2015 | Van Den Koek et al. |
| 9,242,224 | B2 | 1/2016 | Redjdal et al. |
| 9,409,141 | B2 | 8/2016 | Sunkara et al. |
| 2007/0087470 | A1 | 4/2007 | Sunkara et al. |
| 2011/0150752 | A1 * | 6/2011 | Katare .................. B82Y 30/00 423/610 |
| 2012/0027955 | A1 | 2/2012 | Sunkara et al. |
| 2012/0091541 | A1 | 4/2012 | Suchomel et al. |
| 2012/0235203 | A1 * | 9/2012 | Mukherjee ............ B22F 1/0018 257/98 |
| 2013/0017145 | A1 * | 1/2013 | Sunkara ................ B01J 19/088 423/592.1 |
| 2014/0217630 | A1 | 8/2014 | Redjdal et al. |

OTHER PUBLICATIONS

Liu, Liu, Smith, Boerio-Goates, Woodfield, "Preparation of a wide array of ultra-high purity metals, metal oxides, and mixed metal oxides with uniform particle sizes from 1 nm to bulk", NIST-Nanotech 2007, vol. 4, pp. 214-217, www.nsti.org.

Ajayi, Kumari, Jaramillo-Cabanzo, Spurgeon, Jasinski, Sunkara, "A rapid and scalable method for making mixed metal oxide alloys for enabling accelerated materials discovery", J Materials Research, 2016, vol. 31, pp. 1596-1607.

Sunkara, Vendra, Kim, Druffel, Sunkara, "Scalable synthesis and photoelectrochemical properties of copper oxide nanowire arrays and films", Catalysis Today, 2013, vol. 199, pp. 27-35.

* cited by examiner

US 10,766,787 B1

PRODUCTION OF MIXED METAL OXIDE NANOSTRUCTURED COMPOUNDS

CROSS-REFERENCE TO RELATED APPLICATIONS

This application claims priority from U.S. Provisional Application No. 62/249,518, filed 2 Nov. 2015, which is included herein in its entirety by reference.

GOVERNMENT INTEREST

Statement Regarding Federally Sponsored R&D

The invention was made with government support under grant nos. DMS 1125909 and 1355438 awarded by the National Science Foundation. The government has certain rights in this invention.

FIELD OF THE INVENTION

The invention relates to methods for synthesizing mixed metal oxide nanoparticles. Specifically, the present invention relates to methods for synthesizing mixed metal oxide nanoparticles whereby two or more predetermined metal precursors are exposed to an oxygen plasma at a temperature of less than about 550° C. in the absence of other metal or non-metal reactants.

BACKGROUND OF THE INVENTION

Following the discovery of carbon nanotubes in 1991, nanomaterials have attracted great research interest due to their unique properties that allow them to be ideal building blocks in important applications such as catalyst supports, absorbent, batteries, solar cells, capacitors, sensors, and polymer composite. Mixed metal oxide nanoparticles are particularly useful in applications such as forming stable electrocatalysts for oxygen evolution, oxygen reduction and nitrogen oxide reduction and as semiconductors for photoelectrochemical water splitting. Depending on the intended application, the mixed metal oxide may require a specific stable phase, such as being provided as a perovskite, pyrochlore, solid solution, or spinel.

Mixed metal oxides have traditionally been synthesized using a solid-state route that involves the mechanical milling of oxides, carbonates or nitrates. However, the solid-state route requires a long processing time and elevated temperatures and pressures to produce the mixed metal oxide. Wet chemical methods, such as sol-gel processes, co-precipitation, solvothermal techniques, and pyrolysis in air, have attempted to overcome the deficiencies of the solid-state route. However, these methods tend to be multi-step and laborious processes that require prolonged heat treatments and, therefore, produce low yields of product which are primarily restricted to equilibrium phases. Further, it can be difficult to control the size, composition, and phase of the mixed metal oxide nanoparticles. More recently methods for preparing mixed metal oxide nanoparticles have included flame spray pyrolysis (FSP) methods such as vapor-fed flame spray pyrolysis, liquid-fed flame spray pyrolysis, and liquid-fed flame assisted spray pyrolysis. But these FSP methods are limited to zirconium, aluminum, titanium, and silicon based oxides for preparation of the mixed metal oxide nanoparticles, and/or the method generates environmentally harmful gases, such as volatile chlorides.

Thus, there exists a need in the art for a more economical and efficient method of producing a variety of mixed-metal oxide nanoparticles of uniform size, novel composition and high-purity with predictable phases. Preferably, these mixed-metal oxide nanoparticles may comprise two, three, four, five, and potentially more metals.

SUMMARY OF THE PRESENT INVENTION

The present development is a method for the rapid and controlled synthesis of mixed metal oxide nanoparticles using relatively low temperature plasma oxidation of liquid droplets of predetermined mixed metal precursors. Compositions reflecting the metal precursor stoichiometries are produced and the mixed metal oxide's metastable phase, such as spinel or rocksalt solid solution, can be controlled based on the metal precursor stoichiometries. The synthesis of mixed transition metal oxide comprising binary metal oxides, ternary mixed metal oxides, quaternary mixed metal oxides and pentanary mixed metal oxides are demonstrated herein.

Generally, the method comprises combining two or more metal precursors in water to form a metal precursor solution, and then reacting the metal precursor solution in an atmospheric microwave plasma flame reactor, wherein the temperature of the plasma flame does not exceed about 550° C. The reactor may have an upstream or a downstream plasma jet configuration. The upstream configuration, wherein the flame is oriented vertically in such a way that the tip of the jet is pointing upwards, is recommended for thin film deposition on substrates. The downstream configuration, wherein the tip of the jet points vertically downward, is recommended for the production of relatively large quantities of ultrafine mixed metal oxide powder.

DETAILED DESCRIPTION OF THE PRESENT DEVELOPMENT

Figure 1:
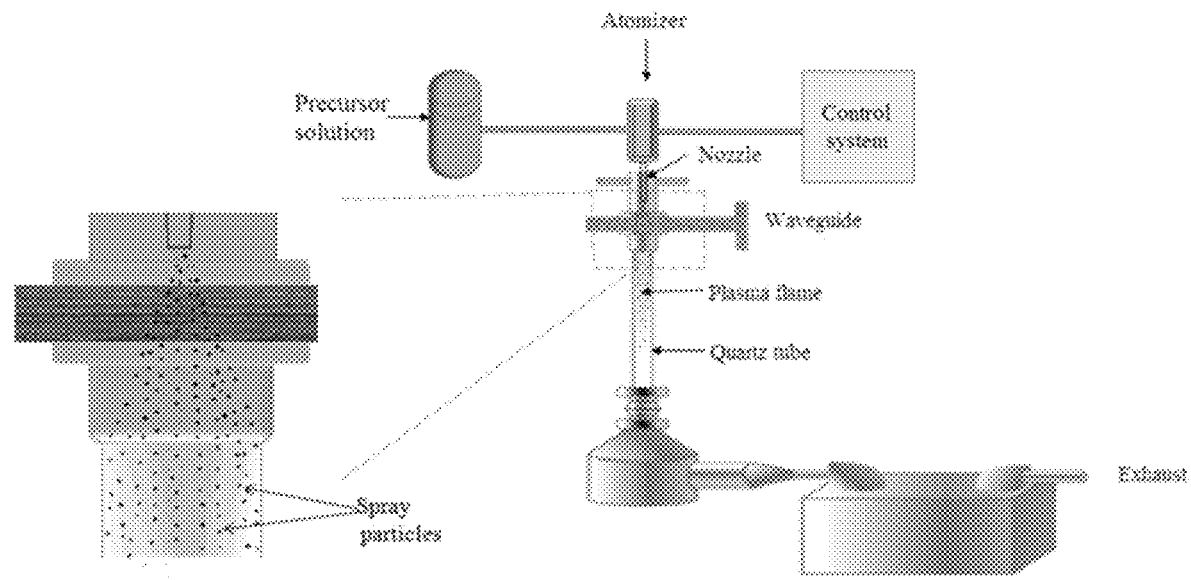
FIG. 1 is a schematic diagram of a microwave plasma reactor, such as may be used to convert the metal precursor solution to the mixed metal oxide alloy nanoparticles.

The present development is a method for the rapid and controlled synthesis of mixed metal oxide nanoparticles. The method comprises combining two or more metal precursors in water to form a metal precursor solution, and then reacting the metal precursor solution in an atmospheric microwave plasma flame reactor, wherein the temperature of the plasma flame does not exceed about 550° C. The resulting mixed metal oxide nanoparticles have a composition that reflect the stoichiometries of the metal precursors. Because the resulting mixed metal oxide is essentially free from contaminates, specific metastable phases are produced based on the metal precursor stoichiometries.

As used herein, "nanoparticle" is a broad term used to designate a particle of matter measuring from less than 1 nm to about 100 nm in one of its dimensions and having any shape, including but not limited to nanowires, nanorods and nanospheres. Nanoparticle may refer to a particle of matter in any particular solid or semi-solid form, including, but not limited to, crystalline and amorphous solid forms.

As used herein, the term "metal" is a broad term and is used to designate any element in the Period Table of Elements that is generally recognized by those skilled in the art as metals, including but not limited to those elements traditionally referred to as alkali metals, alkaline earth metals, lanthanides, actinides, transition metals, post-transition metals and metalloids. Unless otherwise expressly stated, the metals referred to herein may be in any oxidation state and may be in elemental form or complexed.

In a preferred embodiment, the metal precursors include a metal selected from the group consisting of nickel, manganese, iron, cobalt, lanthanum, strontium, calcium, rhodium, zirconium, copper, yttrium, and combinations thereof. The metal may be bonded to one or more organic groups, such as but not limited to an alkoxide group, an oxalate group, an acetyl-acetonate group, a benzoate group, a carbonyl group, an acetate group, and combinations thereof. Alternatively, the metal may be complexed to one or more inorganic or organometallic groups, such as but not limited to a water molecule, a nitrate, a sulfate, a chloride, a phosphate, a carbonate, a bromide, an iodide, and combinations thereof. Exemplary metal precursors include, but are not limited to, nickel(II) nitrate hexahydrate, manganese(II) nitrate tetrahydrate, iron(II) nitrate nonahydrate, cobalt(II) nitrate hexahydrate, lanthanum(III) nitrate nonahydrate, strontium(II) nitrate, calcium nitrate tetrahydrate, rhodium (II) nitrate hydrate, zirconium(IV) oxynitrate, copper(II) nitrate trihydrate, yttrium(III) nitrate hexahydrate, and combinations thereof.

A metal precursor solution is prepared by mixing at least two metal precursors in water until the metal precursors are well blended. Deionized water is recommended. The amount of each metal precursor to be included in the metal precursor solution is determined based on the desired composition of the final mixed metal oxide. For exemplary purposes only and without limiting the scope of the invention, some recommended quantities of nickel(II) nitrate hexahydrate, manganese(II) nitrate tetrahydrate and deionized water to prepare a family of nickel-manganese oxide nanoparticles having specific compositions are provided in Table 1. It is recommended that the amount of water used be the minimum necessary to combine the metal precursors.

TABLE 1

| Composition | Phase | Amount (g) $Ni(NO_3)_2 \cdot 6H_2O$ | Amount (g) $Mn(NO_3)_2 \cdot 4H_2O$ | Amount (mL) DI water |
|---|---|---|---|---|
| NiO | rock-salt | 290.79 | 0.00 | 1000.00 |
| $Ni_{0.9}Mn_{0.1}O$ | (space group: Fm3m) | 261.72 | 25.10 | 1000.00 |
| $Ni_{0.8}Mn_{0.2}O_4$ | tetragonal spinel | 232.64 | 50.20 | 1000.00 |
| $Ni_{0.7}Mn_{0.3}O_4$ | (space group: I4$_1$/amd) | 203.56 | 75.30 | 1000.00 |
| $Ni_{0.6}Mn_{0.4}O_4$ | | 174.48 | 100.40 | 1000.00 |
| $Ni_{0.5}Mn_{0.5}O_4$ | | 145.40 | 125.50 | 1000.00 |
| $Ni_{0.4}Mn_{0.6}O_4$ | | 116.32 | 150.60 | 1000.00 |
| $Ni_{0.3}Mn_{0.7}O_4$ | | 87.24 | 175.70 | 1000.00 |
| $Ni_{0.2}Mn_{0.8}O_4$ | | 58.16 | 200.80 | 1000.00 |
| $Ni_{0.1}Mn_{0.9}O_4$ | | 29.08 | 225.90 | 1000.00 |
| MnO | cubic (space group: 2/m–3) | 0.00 | 251.00 | 1000.00 |

Various other mixed metal precursors may be combined as shown in Table 2 to prepare binary mixed metal oxides, ternary mixed metal oxides, quaternary mixed metal oxides and pentanary mixed metal oxides. As with the nickel manganese precursor solution, the amount of each metal precursor and water will vary depending on desired composition and phase of the final mixed metal oxide nanoparticle.

TABLE 2

| System | Composition | Metal Precursor(s) | Phase(s) |
|---|---|---|---|
| Binary | $Ni_xMn_{1-x}O_y$, $0.0 < x < 1.0$ | $Ni(NO_3)_2 \cdot 6H_2O$<br>$Mn(NO_3)_2 \cdot 4H_2O$ | $0.0 < x < 0.1$ Rock-salt,<br>$0.1 < x < 1.0$ Tetragonal, (spinel) |
| | $Ni_xFe_{1-x}O_y$, $0.0 < x < 1.0$ | $Ni(NO_3)_2 \cdot 6H_2O$<br>$Fe(NO_3)_3 \cdot 9H_2O$ | $0.0 < x < 0.1$ Rock-salt,<br>$0.1 < x < 1.0$ Cubic, (spinel) |
| | $La_2Zr_2O_{7-\delta}$ | $La(NO_3)_3 \cdot 9H_2O$<br>$ZrO(NO_3)_2 \cdot xH_2O$ | Cubic (spinel) |
| Ternary | $CoMn_xFe_{2-x}O_4$<br>$0.0 < x < 1.0$ | $Co(NO_3)_2 \cdot 6H_2O$<br>$Mn(NO_3)_2 \cdot 4H_2O$<br>$Fe(NO_3)_3 \cdot 9H_2O$ | Cubic (spinel) |
| | $NiCo_xMn_{2-x}O_4$<br>$0.0 < x < 1.0$ | $Ni(NO_3)_2 \cdot 6H_2O$<br>$Co(NO_3)_2 \cdot 6H_2O$<br>$Mn(NO_3)_2 \cdot 4H_2O$ | Tetragonal (spinel) |
| | $NiMn_xFe_{2-x}O_4$<br>$0.0 < x < 1.0$ | $Ni(NO_3)_2 \cdot 6H_2O$<br>$Mn(NO_3)_2 \cdot 4H_2O$<br>$Fe(NO_3)_3 \cdot 9H_2O$ | Cubic (spinel) |
| | $La_{1-x}Sr_xMnO_3$<br>$0.0 < x < 0.10$ | $La(NO_3)_3 \cdot 9H_2O$<br>$Sr(NO_3)_2$<br>$Mn(NO_3)_2 \cdot 4H_2O$ | Rhombohedral (Perovskite) |
| | $La_{1-x}Ca_xMnO_3$<br>$0.0 < x < 0.30$ | $La(NO_3)_3 \cdot 9H_2O$<br>$Ca(NO_3)_2 \cdot 4H_2O$<br>$Mn(NO_3)_2 \cdot 4H_2O$ | Rhombohedral (Perovskite) |
| | $La_{1-x}Ca_xRhO_3$<br>$0.0 < x < 0.20$ | $La(NO_3)_3 \cdot 9H_2O$<br>$Ca(NO_3)_2 \cdot 4H_2O$<br>$Rh(NO_3)_3 \cdot xH_2O$ | Orthorhombic (Perovskite) |
| | $La_{1-x}Sr_xRhO_3$<br>$0.0 < x < 0.10$ | $La(NO_3)_3 \cdot 9H_2O$<br>$Sr(NO_3)_2$<br>$Rh(NO_3)_3 \cdot xH_2O$ | Orthorhombic (Perovskite) |
| | $La_2Zr_{2-x}Ni_xO_7$<br>$0.0 < x < 0.50$ | $La(NO_3)_3 \cdot 9H_2O$<br>$ZrO(NO_3)_2 \cdot xH_2O$<br>$Ni(NO_3)_2 \cdot 6H_2O$ | Cubic (Pyrochlore) |
| | $La_2Zr_{2-x}Rh_xO_7$<br>$0.0 < x < 0.10$ | $La(NO_3)_3 \cdot 9H_2O$<br>$ZrO(NO_3)_2 \cdot xH_2O$<br>$Rh(NO_3)_3 \cdot xH_2O$ | Cubic (Pyrochlore) |
| Quaternary | $La_{1-x}Ca_xRh_{0.5}Cu_{0.5}O_3$<br>$0.0 < x < 0.10$ | Lanthanum(III) acetate hydrate<br>$Ca(NO_3)_2 \cdot 4H_2O$<br>$Rh(NO_3)_3 \cdot xH_2O$<br>$Mn(NO_3)_2 \cdot 3H_2O$ | Orthorhombic (Perovskite) |
| | $La_{1-x}Sr_xCo_{0.5}Ni_{0.5}O_3$<br>$0.0 < x < 0.30$ | Lanthanum(III) acetate hydrate<br>$Sr(NO_3)_2$<br>$Co(NO_3)_2 \cdot 6H_2O$<br>$Ni(NO_3)_2 \cdot 6H_2O$ | Rhombohedral (Perovskite) |
| | $La_{1-x}Ca_xCo_{0.5}Ni_{0.5}O_3$<br>$0.0 < x < 0.30$ | Lanthanum(III) acetate hydrate<br>$Ca(NO_3)_2 \cdot 4H_2O$<br>$Co(NO_3)_2 \cdot 6H_2O$<br>$Ni(NO_3)_2 \cdot 6H_2O$ | Rhombohedral (Perovskite) |
| | $LiNi_{0.3}Mn_{0.6}Co_{0.1}O_2$ | Metallic Lithium<br>$Ni_{0.2}Mn_{0.6}Co_{0.2}O_x$ | Rhombohedral (Perovskite) |
| | $LiNi_{0.6}Mn_{0.2}Co_{0.2}O_2$ | Metallic Lithium<br>$Ni_{0.6}Mn_{0.2}Co_{0.2}O_x$ | Tetragonal R3m |
| Pentanary | $La_{1-x}Ca_xZr_{1.641}Rh_{0.109}Y_{0.25}O_7$<br>$x = 1.89$ | Lanthanum(III) acetate hydrate<br>$Ca(NO_3)_2 \cdot 4H_2O$<br>$ZrO(NO_3)_2 \cdot xH_2O$<br>$Rh(NO_3)_3 \cdot xH_2O$<br>$Y(NO_3)_3 \cdot 6H_2O$ | Cubic (Pyrochlore) |

It is anticipated that solvents other than water may be used. The metal precursors should be soluble in solvent. Preferably the upper solubility limit should be at least 20 g/L. If the upper solubility is less than 20 g/L raising the temperature by 50° C.-90° C. helps achieve better dissolution of solutes in an endothermic solvation reaction. Exemplary alternative solvents include polar organic solvents, non-polar organic solvents, alcohols, combustive fuel that can reduce the need for plasma power thereby reducing the energy requirements of the process, acetic acid, methanol, ethanol, propanol, butanol, formic acid, formamide, acetone, ethyl acetate, methyl ethyl ketone, acetonitrile, N,N-dimethylformamide, dimethyl sulfoxide, toluene, carbon tetrachloride, benzene, diethyl ether, hexane, tetrahydrofuran, methylene chloride, or a combination thereof.

To produce the mixed metal oxide nanoparticles of the present invention, the metal precursor solution is reacted in an atmospheric microwave plasma flame reactor, wherein the temperature of the plasma flame does not exceed about 550° C. A schematic of an exemplary atmospheric microwave plasma flame reactor 10 with a downstream configuration is shown in FIG. 1. The metal precursor solution 90 is fed into an atomizer 12 where the precursor solution 20 is converted to an aerosol form with droplets having diameters ranging from about 1 micron to about 100 microns. In a preferred embodiment, the atomizer 12 is an ultrasonic atomizer as is known in the art. In a preferred embodiment, the aerosolized metal precursor has an average droplet size of about 5 microns. The aerosolized droplets and compressed air are forced through a nozzle 14 of the atomizer and are sprayed into a quartz tube 16 in the presence of a plasma flame 18 where the metal precursor solution droplets are converted to mixed metal oxide alloy nanoparticles. The nanoparticles are directed by a vacuum pump into an air filter collection station 20 positioned downstream of the plasma flame 18 and are collected. As is known in the art, the plasma flame reactor 10 may include control systems and waveguides to facilitate user control of the reactor 10.

Plasma flame reactors are known in the art. For example, the plasma reactor may have a spray pyrolysis configuration, or it may be a fluidized bed reactor or a low pressure plasma reactor, or it may be designed for a roll to roll process, or it may be some combination thereof. For the purposes of practicing the present invention, any plasma flame reactor that can hold a temperature of between 300° C. and 900° C. may be used to practice the invention. As reported herein, the metal precursor solution is reacted in an atmospheric microwave plasma flame reactor, wherein the temperature of the plasma flame does not exceed about 550° C. This maximum temperature of 550° C. is set arbitrarily and is based on the thermal stability of fluorine-doped tin-oxide (FTO) coated glass substrates. FTO-coated glass substrates are the preferred substrate because of their poor electrocatalytic properties.

Figures 2, 3:
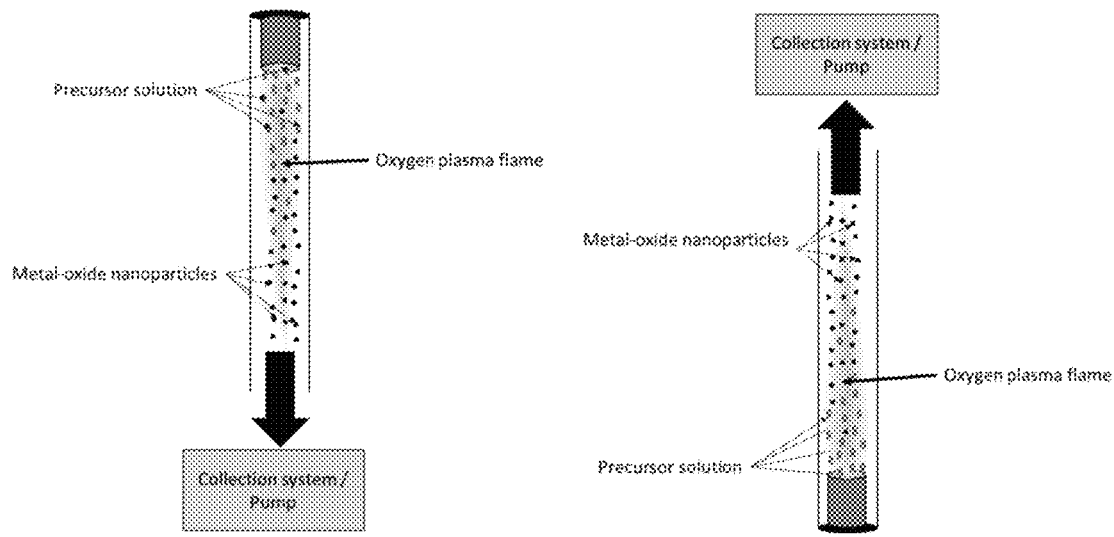
FIG. 2 is a schematic diagram of the downstream plasma jet of the reactor of FIG. 1.
FIG. 3 is a schematic diagram of an upstream plasma jet which may be used in a plasma reactor to convert the metal precursor solution to the mixed metal oxide alloy nanoparticles.

For conversion of the metal precursor solution to the mixed metal oxide alloy nanoparticles, the plasma flame may be a radiofrequency plasma, a microwave plasma, or an electron cyclotron resonance plasma. These particular types of plasma flames are presented as examples only and are not intended to represent all possible plasma flame options nor to limit the scope of the invention with respect to the type of plasma flame. As shown in FIGS. 1 and 2, the plasma flame 18 may have a downstream configuration, wherein the tip of the jet points vertically downward. This downstream configuration is recommended for the production of relatively large quantities of ultrafine mixed metal oxide powder. Alternatively, as shown in FIG. 3, the plasma flame 18 may have an upstream configuration, wherein the flame is oriented vertically in such a way that the tip of the jet is pointing upwards. The upstream configuration is recommended for thin film deposition on substrates.

As is known in the art, the metal precursor solution may be fed into the plasma flame in a variety of ways. Any means to deliver the solution into the flame so as to produce mixed metal oxide alloy nanoparticles may be used and it is anticipated that the method selected may be dependent on the type of plasma reactor employed to convert the metal precursor solution to the mixed metal oxide alloy nanoparticles. Aerosolizing the solution is one recommended technique. Alternatively, the metal precursor solution may be distributed onto a thermally-stable substrate and the thermally-stable substrate including the metal precursor solution is exposed to the plasma oxygen. Factors for consideration for selection of the thermally-stable substrate are known by those skilled in the art. Some preferred thermally-stable substrates are a fluorine-doped tin-oxide coated glass, an indium tin oxide substrate, or quartz.

To convert the metal precursor solution to the mixed metal oxide alloy nanoparticle, the metal precursor solution is exposed to the plasma flame for up to about 60 seconds, and preferably for from about 15 seconds to about 60 seconds, and more preferably from about 25 seconds to about 35 seconds.

The following examples illustrate the preferred embodiments of the present invention in detail. Those skilled in the art may recognize that there are numerous variations and modifications of this invention that are encompassed by its scope. Accordingly, the description of the preferred embodiments should not be deemed to limit the scope of the present invention.

Experiments were conducted using nickel and manganese oxides for binary systems and using nickel, manganese and iron oxide alloys for ternary systems. Unless otherwise noted, chemically pure grades of nickel(II) nitrate hexahydrate, manganese(II) nitrate hydrate, and iron(II) nitrate non-hydrate (research grade, Sigma Aldrich) were used as starting materials without further purification. Substrates are cleaned prior to deposition by ultrasonication in an alkaline aqueous solution, deionized water, ethanol, and deionized water for about 10 minutes per step.

A series of nickel-manganese oxide alloy nanoparticles is made by preparing approximately 1M nickel-manganese precursor solutions according to the concentrations as shown in Table I. About 0.1 ml of each nickel-manganese precursor solution is then sprayed onto a 2 $cm^2$ piece of fluorine-doped tin-oxide (FTO) coated glass substrate and reacted in an atmospheric microwave plasma flame reactor with an upstream configuration with an input power of about 500 W and a volumetric flow of argon at 2 standard liters per minute (slpm) and 11 slpm air for approximately 30 sec. The argon is only necessary for plasma ignition and is turned off after obtaining a stable plasma. The substrate temperature is measured using a pyrometer and is determined to be between 500° C. and 550° C. The plasma power is set in such a way that the temperature of the substrate does not exceed 550° C. The catalyst adheres well to the surface of the substrate forestalling any use of a surfactant.

The morphology of the nickel-manganese oxide alloy nanoparticles was characterized using an FEI Nova 600 NanoLab scanning electron microscope (SEM). A Bruker D8 powder X-ray diffraction (XRD) system was used for the crystal phase analysis. High-resolution transmission electron microscopy (HR-TEM), selected area electron diffraction (SAED) and nanoprobe-based energy dispersive X-ray spectroscopy (EDX) measurements were conducted using the FEI Tecnai F20 transmission electron microscope. Detailed results of these analyses are not reported herein, but are available upon request from the inventors.

Figure 4:
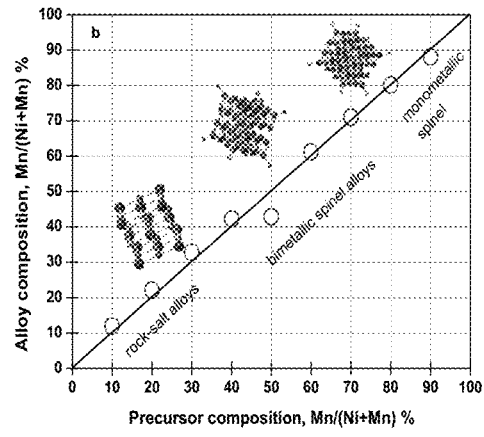
FIG. 4 is a parity plot between the nominal compositions (at % basis) and the TEM-EDX measured alloy composition (at % basis) for the series $Ni_xMn_{1-x}O_y$ (0.0≤x≤1.0)

FIG. 4 is a parity plot between the measured precursor compositions (at % basis) and the TEM-EDX composition (at % basis) of the as-prepared alloy samples. With the exception of alloy composition Mn/(Ni+Mn)%=50 (or x=0.5), which gives a slight deviation from the precursor composition, all other samples showed good agreement between the alloy and the nominal precursor compositions. Without being bound by theory, it is proposed that the anomaly observed with composition x=0.5 may be explained in terms of the transition from the rocksalt to the spinel solid solution phase, which may result in internal stress, anisotropic strain and disorder.

Figure 5:
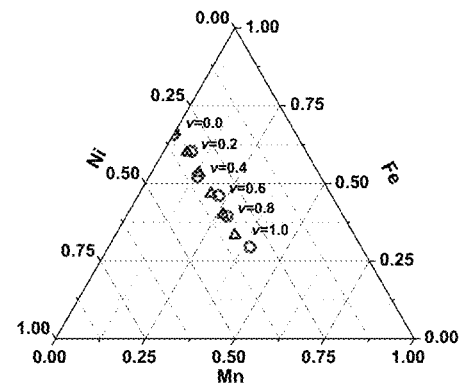
FIG. 5 is a ternary plot of $NiMn_zFe_{2-z}O_4$ (0≤z≤1) showing the correlation between the nominal precursor compositions (Δ) and the TEM-EDX measured alloy composition (O) of the as-prepared alloy samples; and, FIG. 6 is a comparison of a binary sample of $Ni_{0.2}Mn_{0.8}O_4$ (x=0.2) prepared via plasma oxidation and thermal oxidation as analyzed with X-ray diffraction.

Ternary spinel oxides comprising manganese substituted nickel ferrite, with nominal series formula $NiMn_zFe_{2-z}O_4$ (where z=0.0, 0.20, 0.40, 0.60, 0.80 and 1.0) are synthesized by the plasma spray method. The XRD reflections show highly crystalline nanoparticles with exceptional phase purity. A monotonic shift of the 311 peak position to the left with increasing manganese doping is consistent with the formation of a spinel solid solution. The same family of peaks indexed to cubic spinel phase (space group Fd-3m) appears in all six samples and no foreign peaks are observed which can be interpreted to mean that no other phase co-existed with sample phase. FIG. 5 is a ternary plot of $NiMn_zFe_{2-z}O_4$ ($0 \leq z \leq 1$) showing excellent correlation between the nominal precursor compositions (Δ) and the TEM-EDX measured alloy composition (O) of the as-prepared alloy samples. The elemental analysis of the NiM- $n_zFe_{2-z}O_4$ (0≤z≤1) nanoparticles, as shown in Table 3, confirms that the proportion of the elements is consistent with the precursor composition.

TABLE 3

| | TEM-EDX Analyzed Composition, at. % | | | |
|---|---|---|---|---|
| z | O | Mn | Fe | Ni |
| 0.0 | 61.9 ± 0.7 | — | 25.1 ± 0.6 | 13.1 ± 0.5 |
| 0.2 | 61.8 ± 0.4 | 3.1 ± 0.1 | 23.6 ± 0.4 | 12.5 ± 0.3 |
| 0.4 | 61.0 ± 0.4 | 5.3 ± 0.2 | 20.4 ± 0.3 | 13.4 ± 0.3 |
| 0.6 | 58.2 ± 0.5 | 9.4 ± 0.3 | 19.3 ± 0.4 | 13.1 ± 0.4 |
| 0.8 | 57.4 ± 0.4 | 12.0 ± 0.3 | 16.8 ± 0.3 | 13.8 ± 0.3 |
| 1.0 | 55.5 ± 0.5 | 17.6 ± 0.4 | 13.1 ± 0.3 | 13.8 ± 0.3 |

Figure 6:
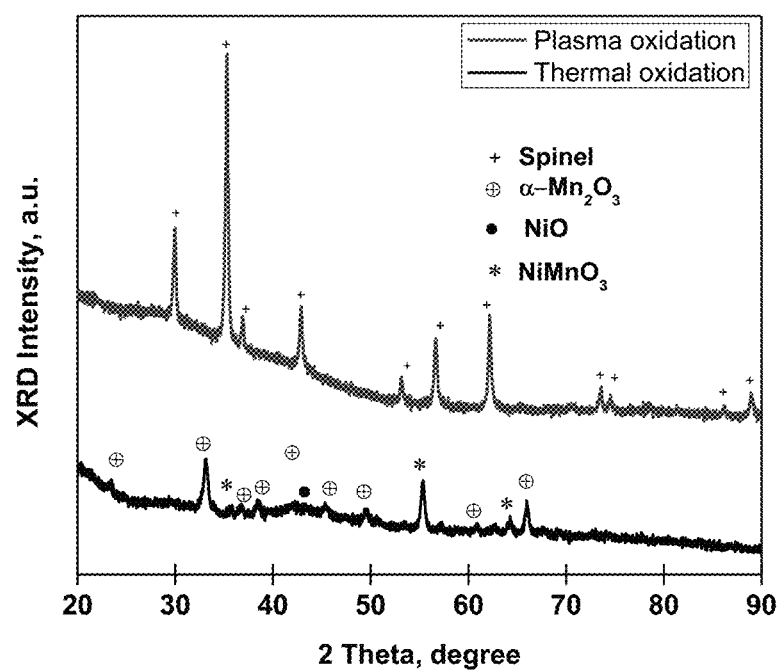

For comparison to prior art techniques, a binary nickel-manganese oxide nanoparticle sample with the composition $Ni_{0.2}Mn_{0.8}O_4$ (x=0.2) was prepared through traditional thermal oxidation route. The phases obtained are ilmenite ($NiMnO_3$), bixbyite ($\alpha$-$Mn_2O_3$) and bunsenite phases (NiO). As shown in FIG. 6, this phase distribution is completely different from the result obtained with plasma oxidation and the plasma oxidation method better reflects the reaction off-stoichiometry, producing solid solution nickel manganite spinel.

The method of the present development produces the mixed metal oxide nanoparticles without the need to include other reactants, such as polymer agents, chemical bases, chemical acids, compounds that lead to the partial or complete hydrolysis of the metal salt and provide counter-cations for the anion of the metal salt, organic solvents, alcohols, urea, citric acid, ethylene glycol, ammonium carbonate, ammonium bicarbonate, ammonium sesquicarbonate, ammonium chloride, ammonium oxalate, ammonium sulfate, ammonium hydroxide, ammonium nitrate, lithium hydroxide, sodium hydroxide, potassium hydroxide, magnesium hydroxide, calcium hydroxide, ethanol, methanol, 1-propanol, 2-propanol, tetrahydrofuran, and mixtures thereof.

The mixed metal oxides synthesized by the present method may be used in a wide range of applications. For example, manganese doped nickel ferrite nanoparticles ($NiMn_zFe_{2-z}O_4$ (0≤z≤1)) may be synthesized in accordance with the presently-disclosed subject matter that exhibit considerable electrocatalytic activity towards oxygen evolution reaction (OER), achieving an overpotential of 0.39 V at a benchmarking current density of 10 $mAcm^{-2}$ for a low manganese content of z=0.20. In other applications of the presently-disclosed subject matter, mixed metal oxide alloys can be synthesized that are useful as cathode materials in lithium ion batteries, as thermoelectric generators, as heterogenous catalysts in petrochemical applications, and as wide band gap material in power devices.

The inventors have previously published technical articles and pending patent applications presenting information about various types of plasma jet reactors that may be used to practice the present invention and providing detailed analyses of the specific chemical reactions which occur in the process of converting the metal precursor solution to the mixed metal oxide alloy nanoparticles. These publications and applications include U.S. Pat. No. 9,409,141; A Rapid and Scalable Method for Making Mixed Metal Oxide Alloys for Enabling Accelerated Materials Discovery, J. Mater. Res. 31, pp. 1596-1607; Gas-Phase, Bulk Production of Metal Oxide Nanowires and Nanoparticles Using a Microwave Plasma Jet Reactor, Journal of Physical Chemistry C, 2008, 112, 17750-17754; U.S. application Ser. No. 13/439,592 (currently pending); U.S. application Ser. No. 13/942,633 (currently pending); U.S. App. 62/375,414 (currently pending), each of which is incorporated herein in its entirety by reference.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a layer" includes a plurality of such layers, and so forth.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

As used herein, ranges can be expressed as from about one particular value and/or to about another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All compositional percentages used herein are presented on a "by weight" basis, unless designated otherwise.

It is understood that, in light of a reading of the foregoing description and drawings, those with ordinary skill in the art will be able to make changes and modifications to the present invention without departing from the spirit or scope of the invention, as defined herein. For example, those skilled in the art may.

What is claimed is:

1. A method for synthesizing mixed metal oxide nanoparticles consisting of:
   (a) providing a first metal precursor;
   (b) providing at least a second metal precursor;

(c) providing a solvent selected from the group consisting of a water, polar organic solvent, a non-polar organic solvent, an alcohol, a combustive fuel, acetic acid, methanol, ethanol, propanol, butanol, formic acid, formamide, acetone, ethyl acetate, methyl ethyl ketone, acetonitrile, N, N-dimethylformamide, dimethyl sulfoxide, toluene, carbon tetrachloride, benzene, diethyl ether, hexane, tetrahydrofuran, methylene chloride, and combinations thereof;

(d) mixing the first metal precursor, the second metal precursor, and the solvent to form a metal precursor solution;

(e) injecting the metal precursor solution into an atmospheric microwave plasma flame reactor to expose the metal precursor solution to an oxygen plasma flame to form mixed metal oxide alloy nanoparticles, wherein the plasma flame is held at a temperature less than or equal to 550° C. and wherein the metal precursor solution is exposed to the plasma flame for up to about 60 seconds;

(f) cooling the mixed metal oxide alloy nanoparticles; and (g) collecting the mixed metal oxide alloy nanoparticles in an air filter collection station positioned downstream of the plasma flame, wherein the first metal precursor and the at least second metal precursor are each selected from the group consisting of nickel, manganese, iron, cobalt, lanthanum, strontium, calcium, rhodium, zirconium, copper, yttrium, and combinations thereof, and wherein the first metal precursor and the second metal precursor define a stoichiometry which produces specific metastable phases and the resulting mixed metal oxide nanoparticles have a composition that reflect the stoichiometry of the metal precursors which is essentially free from contaminates.

2. The method of claim 1 wherein the oxygen plasma flame has a jet that is oriented vertically in such a way that the tip of the jet is pointing upwards or is oriented vertically in such a way that the tip of the jet is pointing downwards.

3. The method of claim 1 wherein the first metal precursor or the at least second metal precursor or the first metal precursor and the at least second metal precursor are complexed with an alkoxide group, an oxalate group, an acetylacetonate group, a benzoate group, a carbonyl group, an acetate group, a water molecule, a nitrate, a sulfate, a chloride, a phosphate, a carbonate, a bromide, an iodide, and combinations thereof.

4. The method of claim 1 wherein the at least a second metal precursor comprises one metal precursor or two metal precursors or three metal precursors or four metal precursors.

5. The method of claim 1 wherein the mixed metal oxide alloy nanoparticles are nanowires, nanorods, nanospheres or a combination thereof.

* * * * *